United States Patent [19]

Imaizumi et al.

[11] Patent Number: 5,789,717
[45] Date of Patent: Aug. 4, 1998

[54] SEMI-AUTOMATIC TIG WELDING APPARATUS

[75] Inventors: Hiroshi Imaizumi; Toshio Kato; Hideaki Nakashima, all of Tokyo, Japan

[73] Assignee: Aichi Sangyo Co., Ltd., Tokyo, Japan

[21] Appl. No.: 848,033

[22] Filed: Apr. 28, 1997

[30] Foreign Application Priority Data

Apr. 26, 1996 [JP] Japan .................. 8-129322

[51] Int. Cl.$^6$ .................. B23K 9/167
[52] U.S. Cl. .................. 219/75; 219/136
[58] Field of Search .................. 219/75, 74, 136, 219/60 R

[56] References Cited

U.S. PATENT DOCUMENTS

| | | | |
|---|---|---|---|
| 2,710,902 | 6/1955 | Pilia | 219/74 |
| 3,440,393 | 4/1969 | Henderson | 219/60 R |
| 3,469,069 | 9/1969 | Allen | 219/75 |
| 4,136,273 | 1/1979 | Eujita et al. | 219/75 |
| 5,285,042 | 2/1994 | Erichsen et al. | 219/75 |
| 5,481,079 | 1/1996 | Erichsen et al. | 219/75 |

Primary Examiner—Clifford C. Shaw

[57] ABSTRACT

A semi-automatic TIG welding apparatus including a torch handle, a wire-feeding curved nozzle which is disposed within the torch handle and is curved at a point slightly extended from the torch handle, and a TIG torch supporting arm which is fixed to a TIG torch having a shielding gas hose and center gas hose. An inside portion of the TIG torch supporting arm is formed of an electroconductive material. The apparatus further includes water-cooling welding cable hoses which are attached to a water tank, extend through the inner side of the torch handle, and are attached to the TIG torch. The water-cooling welding cable hoses being formed with electroconductive cables provided therein. The apparatus may additionally include a TIG torch rotation block which is rotatably mounted to the wire-feeding curved nozzle and fixed to the TIG torch supporting arm. Thus, a semi-automatic TIG welding apparatus is provided wherein a TIG welder can freely adjust the position of the welding wire, and wherein the welding wire can be inserted to an ideal position, and also wherein the wire-feeding curved nozzle and thus the wire do not fluctuate in position, resulting in great savings in the expense and time related to TIG welding, and also in the amount of labor on the part of the welder.

10 Claims, 4 Drawing Sheets

SEMI-AUTOMATIC TIG WELDING APPARATUS

BACKGROUND OF THE INVENTION

1. Field of the Invention

The present invention relates to non-consumable arc welding, and more particularly to a semi-automatic TIG welding apparatus wherein welding wire is automatically supplied for TIG welding.

2. Description of the Related Art

TIG welding is used for welding all sorts of metals in a wide variety of fields, such as aerospace, electrical power facilities of various types, shipbuilding, automobile manufacturing, petrochemical plants, and so forth.

Known TIG welding has used a manual TIG torch wherein an arc is generated between the torch and base metal, and a welding rod is fed into the molten pool by hand so as to perform welding. Accordingly, the welder must use both hands which means that a tremendous level of skill is required, to the extent that it takes three to five years to train such a TIG welder, which has resulted in great expenses and has taken much time.

Semi-automation of TIG welding has been attempted in order to improve the above-described situation. FIG. 1 is a drawing illustrating a known semi-automatic TIG welding apparatus. In FIG. 1, a torch handle 4 is provided to a TIG torch 1, a wire nozzle supporting arm 17A is fixed to the TIG torch, a wire vertical adjustment slide 22 is fixed to the wire nozzle supporting arm 17A, and a welding wire-feeding nozzle 8 is fixed to the wire vertical adjustment slide 22. Thus, the TIG torch is positioned as the central component, causing an arc thereby, and a wire is inserted from a supplementary position.

The wire vertical adjustment slide 22 is fixed and does not rotate. Accordingly, it becomes difficult to place the TIG torch 1 in an ideal position, and further, since the relative position of the wire-feeding nozzle 8 fluctuates and thus causes the position of the welding wire 9 to fluctuate, it becomes difficult to place the welding wire 9 in an ideal position.

Further, FIG. 1 illustrates other members of a known semi-automatic TIG welding apparatus so that the apparatus can be readily understood, wherein reference numeral 2 denotes a tungsten electrode, reference numeral 3 denotes base metal, reference numeral 5 denotes a welding apparatus electric power source, reference numeral 6 denotes a wire-feeding motor, reference numeral 7 denotes a welding wire reel, reference numeral 10 denotes a welding arc, and reference numeral 21 denotes a flexible cable.

However, fixing the TIG torch 1 to the torch handle 4 in this manner, is problematic in that the position of the wire-feeding nozzle 8 fluctuates due to the arc length between the tungsten electrode 2 at the tip of the welding torch and the base metal 3 being adjusted manually, thus meaning that the positioning of the wire 9 itself also fluctuates, so that the welding wire 9 cannot be positioned ideally, and welding cannot be conducted as desired. This further leads to problems in that the tungsten electrode 2 and welding wire 9 become welded to one another, necessitating interruption of the welding process.

The idea behind the present invention is from the opposite perspective, i.e., the torch handle is fixed to the wire-feeding curved nozzle so as to make the wire-feeding curved nozzle the central component, and the TIG torch is placed in a supplementary position.

The above method is in practical use in semi-automatic MAG welding. However, consumable-type MAG welding and non-consumable-type TIG welding differ in the structure of the welding apparatus, and the idea of making the wire-feeding curved nozzle the central component and placing the TIG torch in a supplementary position is not yet present in the field of TIG welding, thus causing the above-described problems.

SUMMARY OF THE INVENTION

Accordingly, it is an object of the present invention to provide a semi-automatic TIG welding apparatus wherein the TIG welder can freely adjust the position of the welding wire.

It is another object of the present invention to provide a semi-automatic TIG welding apparatus wherein the welding wire can be inserted to an ideal position.

It is a further object of the present invention to provide a semi-automatic TIG welding apparatus wherein the relative positioning of the wire-feeding curved nozzle does not fluctuate, and thus the relative positioning of the welding wire does not fluctuate.

Also, it is a further object of the present invention to provide a semi-automatic TIG welding apparatus wherein meeting the above objects results in great savings in the expenses and time related to TIG welding, and also in the amount of labor on the part of the welder.

The semi-automatic TIG welding apparatus according to the present invention for meeting the above objects comprises: a torch handle provided with a welding switch; a wire-feeding curved nozzle which is disposed within the torch handle and is curved at a point slightly extended from the torch handle; a TIG torch supporting arm which is fixed to a TIG torch which has a shielding gas hose and center gas hose, the TIG torch supporting arm being formed on the inside thereof of an electroconductive material; water-cooling welding cable hoses which are attached to and extend from the lower portion of a water tank through the inner side of the torch handle and to the inner side of the TIG torch, the water-cooling welding cable hoses being formed with electroconductive cables being provided therein and structured such that water flows through the water-cooling welding cable hoses; a TIG torch rotation block which is provided to the wire-feeding curved nozzle and fixes the TIG torch supporting arm, the TIG torch rotation block further being provided with a TIG torch rotation fixing screw and being formed of an electroconductive material; and an electroconductive welding cable which is disposed within the wire-feeding curved nozzle and makes contact with the inner side of the torch rotation block.

Also, the torch handle securely houses the shielding gas hose, center gas hose, water-cooling welding cable hoses, and wire-feeding curved nozzle, so that there is no positional fluctuation thereof. Further, the torch handle is of an approximate size readily gripped by hand. Further yet, the water-cooling welding cable hoses comprise a cable hose which forms a path through which water flows from the water tank into the TIG torch, and a cable hose which forms a path through which water, which has entered the TIG torch, returns to the water tank. Moreover, the electroconductive cable housed within the water-cooling welding cable hoses, the electroconductive material forming the inner side of the TIG torch rotation block, and the electroconductive welding cable are preferably formed of copper.

These and other features, advantages and objects of the present invention will be further understood and appreciated by those skilled in the art by reference to the following specification, claims and appended drawings.

DESCRIPTION OF THE PREFERRED EMBODIMENT

Figure 1:
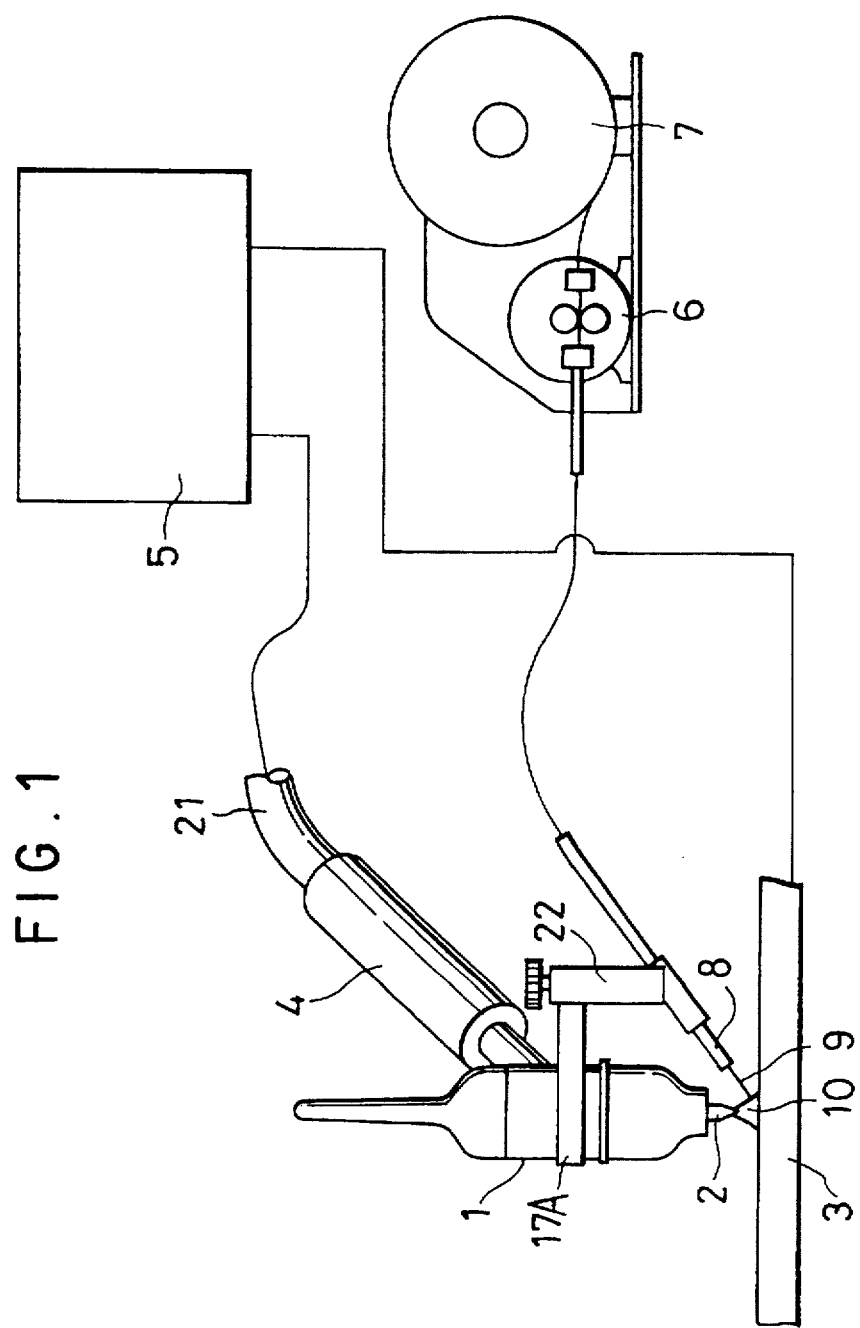
FIG. 1 is a drawing illustrating a known semi-automatic TIG welding apparatus.

According to the present invention, the wire-feeding curved nozzle is housed within the torch handle in a secure manner so that there is no fluctuation in the position thereof relative to the torch handle, and the welding cable is formed of copper electroconductive plate and thus is hard, so the wire-feeding curved nozzle is easy to move, and does not move relative to the torch handle when placed at a desired position and consequently there is also no fluctuation of the position of the welding wire. As a result, the welding wire can be inserted at an ideal position, and welding can be conducted with ease. Also, the welding apparatus can be held by hand by means of the torch handle, and a welding switch is provided thereon, so that welding can be started and stopped with ease.

The TIG torch is fixedly connected with the wire-feeding curved nozzle by means of a TIG torch rotation block which is provided with a torch supporting arm and TIG torch rotation fixing screw, so that moving the wire-feeding curved nozzle automatically moves the TIG torch as well. The TIG torch can also be rotated 360° by means of the TIG torch rotation fixing screw, thus allowing the TIG torch to be placed with ease at the position optimal for welding.

Water-cooling welding cable hoses have been provided, so all that is necessary for cooling is to cause water to flow through the hoses, thus simplifying the structure. Systems employing air-cooling require a structure which can withstand heat, thus necessitating a complicated and consequently heavy structure. Further, the water-cooling welding cable hoses consist of two cables: a supply cable hose which forms a path through which water flows into the TIG torch; and a return cable hose which forms a path through which water which has entered the TIG torch returns to the water tank, thus making for a relatively simple structure and markedly reducing weight.

Also, the torch handle securely houses the wire-feeding curved nozzle, water-cooling welding cable hoses, shielding gas hose, and center gas hose, so that there is no relative positional fluctuation thereof. Thus, these members do not become disorganized and troublesome within the torch handle, but are housed and fixed in an orderly manner.

Electric current flows from a welding apparatus electric power source through two electroconductive cables housed within the water-cooling cable hoses and a welding cable housed within the wire-feeding curved nozzle. This welding cable comes into contact with the inner side of the electroconductive TIG torch rotation block, and the TIG torch rotation block comes into contact with the TIG torch supporting arm which has electroconductive material on the inner side thereof, so that the current which has flowed to the welding cable thus flows to the TIG torch, and consequently, the electrical current flowing from the three cables flows to the TIG torch and creates a great electrical current.

The semi-automatic TIG welding apparatus according to the present invention is used by a welder holding the apparatus by hand, and thus a heavier cable for the electrical current to flow through makes the apparatus heavier for the welder. Accordingly, the present invention involves using three separate lighter cables, so that the apparatus can be lightened and a greater electrical current can be achieved.

The torch handle is of an approximate size readily gripped by hand, making for ease of use.

The wire-feeding curved nozzle is curved at a point slightly extended from the torch handle, making the wire-feeding curved nozzle easier to use, and the wire-feeding curved nozzle can thus be placed at an optimal position. Also, the TIG torch can be rotated 360° by means of the TIG torch rotation fixing screw, thus allowing the TIG torch to be placed with ease at the position optimal for welding in accordance with the direction of welding.

Figure 2:
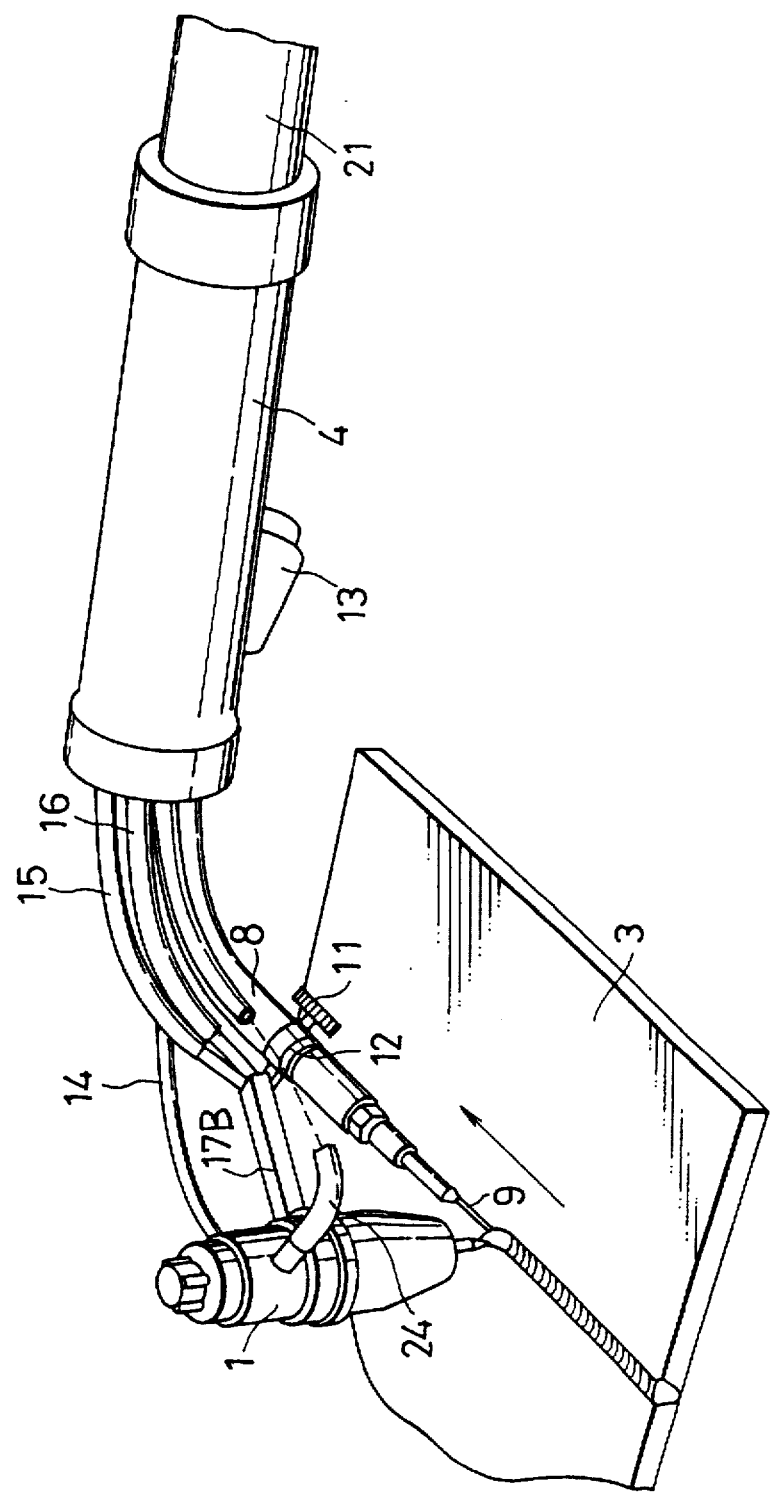
FIG. 2 is a perspective view of the semi-automatic TIG welding apparatus according to the present invention.

FIG. 2 is a perspective view of the semi-automatic TIG welding apparatus according to the present invention, with the state of welding being shown in the base metal 3. The direction of welding is indicated by an arrow.

A welding switch 13 is provided to the torch handle 4, so that welding can be started and stopped by means of the welding switch 13.

The wire-feeding curved nozzle 8 is housed within the torch handle 4, and the wire-feeding curved nozzle 8 is curved at a point slightly extended from the torch handle 4. The TIG torch rotation block 12 is provided to the wire-feeding curved nozzle 8 at the position where the TIG torch supporting arm 17B fixed to the TIG torch 1 is to be fixed. The TIG torch rotation block 12 is provided with a TIG torch rotation fixing screw 11 so that the TIG torch 1 can be rotated 360°.

The inner side of the TIG torch supporting arm 17B is formed of an electroconductive material, and the outside thereof of an insulating material. The TIG rotation block 12 is also formed of an electroconductive material. Copper is appropriate for this electroconductive material.

A shielding gas hose 14 and center gas hose 24 are provided to the TIG torch 1, these two gas hoses being housed within the torch handle 4.

Figure 3:
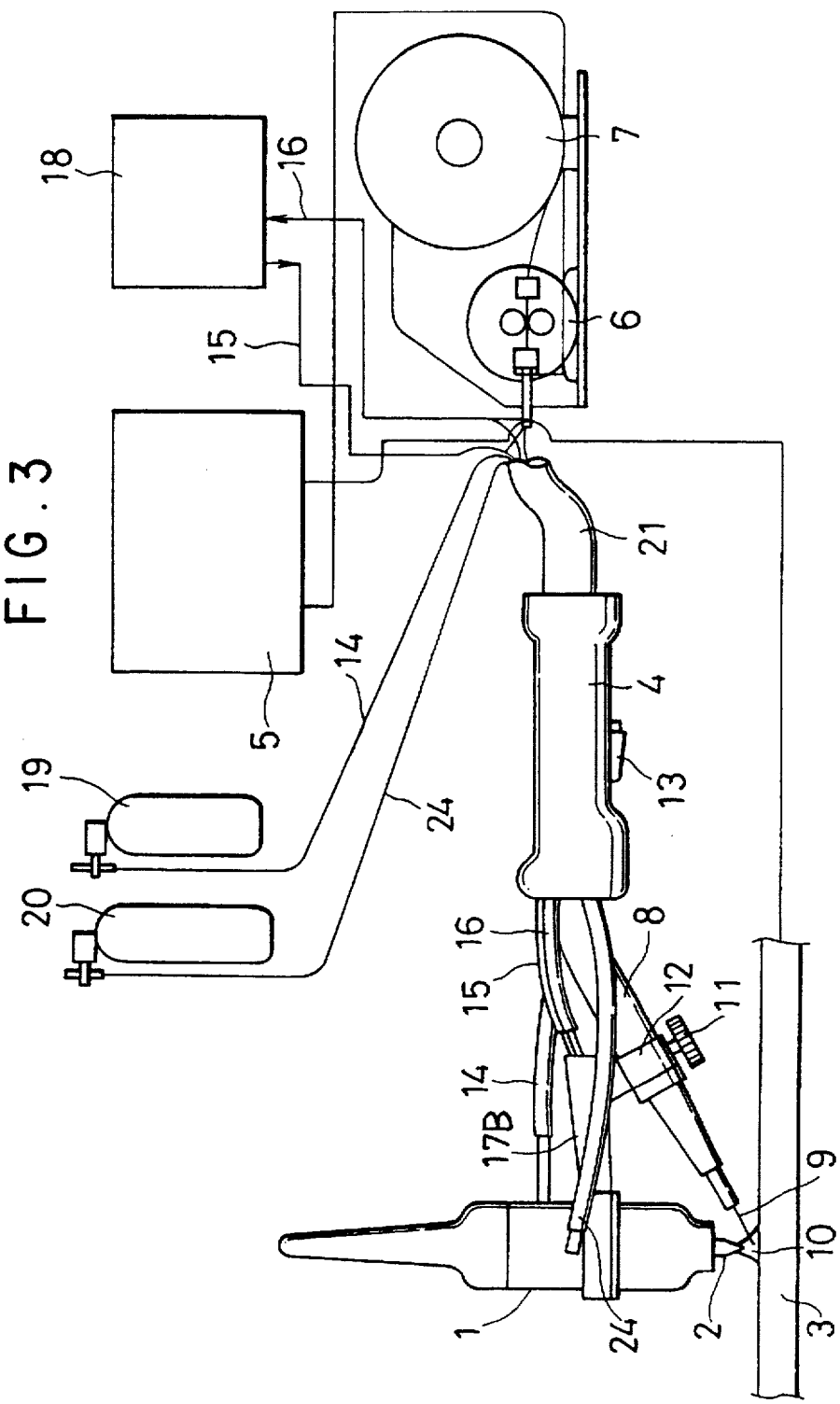
FIG. 3 is a simplified drawing illustrating the entirety of the semi-automatic TIG welding apparatus according to the present invention.

The TIG torch supporting arm 17B is provided with two water-cooling welding cable hoses: a water-cooling welding cable supply hose 15 which forms a path through which water flows into the TIG torch, and a water-cooling welding cable return hose 16 which forms a path through which water which has entered the TIG torch returns to a water tank 18 (FIG. 3). Housed within these water-cooling welding cable hoses 15 and 16 are electroconductive cables (not shown). The water-cooling welding cable hoses 15 and 16 are formed of resin rubber. The water-cooling welding cable hoses 15 and 16 pass through the torch handle 4, through the TIG torch supporting arm 17B, and extend to the inner side of the TIG torch 1. The configuration of the water-cooling system is such that the water from the water tank 18 cools the torch inner body 28 (see FIG. 4) of the TIG torch 1 by means of the water-cooling welding cable supply hose 15, and the water returns to the water tank 18 by means of the water-cooling welding cable return hose 16 (see FIG. 3).

The torch handle 4 securely houses the shielding gas hose 14, center gas hose 24, water-cooling welding cable hoses 15 and 16, and wire-feeding curved nozzle 8, so that there is no relative positional fluctuation thereof, and is of an approximate size readily gripped by hand.

FIG. 3 is a simplified drawing illustrating the entirety of the semi-automatic TIG welding apparatus according to the present invention, showing the two water-cooling welding cable hoses 15 and 16 extending from the water tank 18 and entering the torch handle 4, and the shielding gas hose 14 and center gas hose 24 attached to the shielding gas cylinder 19 and center gas cylinder 20 entering the torch handle 4. A welding electric power supply 5 for providing electrical current is also shown.

Also shown is the welding wire 9 wound on a welding wire reel 7 being fed to the torch handle 4 by means of a wire-feeding motor 6, the electrical power for driving this wire-feeding motor 6 being supplied from the welding apparatus electric power source 5. The electric current from this welding apparatus electric power source 5 flows through the electroconductive cables housed within the water-cooling welding cable hoses 15 and 16, and the welding cable 23.

FIG. 3 also shows a flexible cable 21 extending from the torch handle 4, and further shows the TIG torch 1, tungsten electrode 2, base material 3, and welding wire 9, and moreover shows the state of the welding arc 10.

Figure 4:
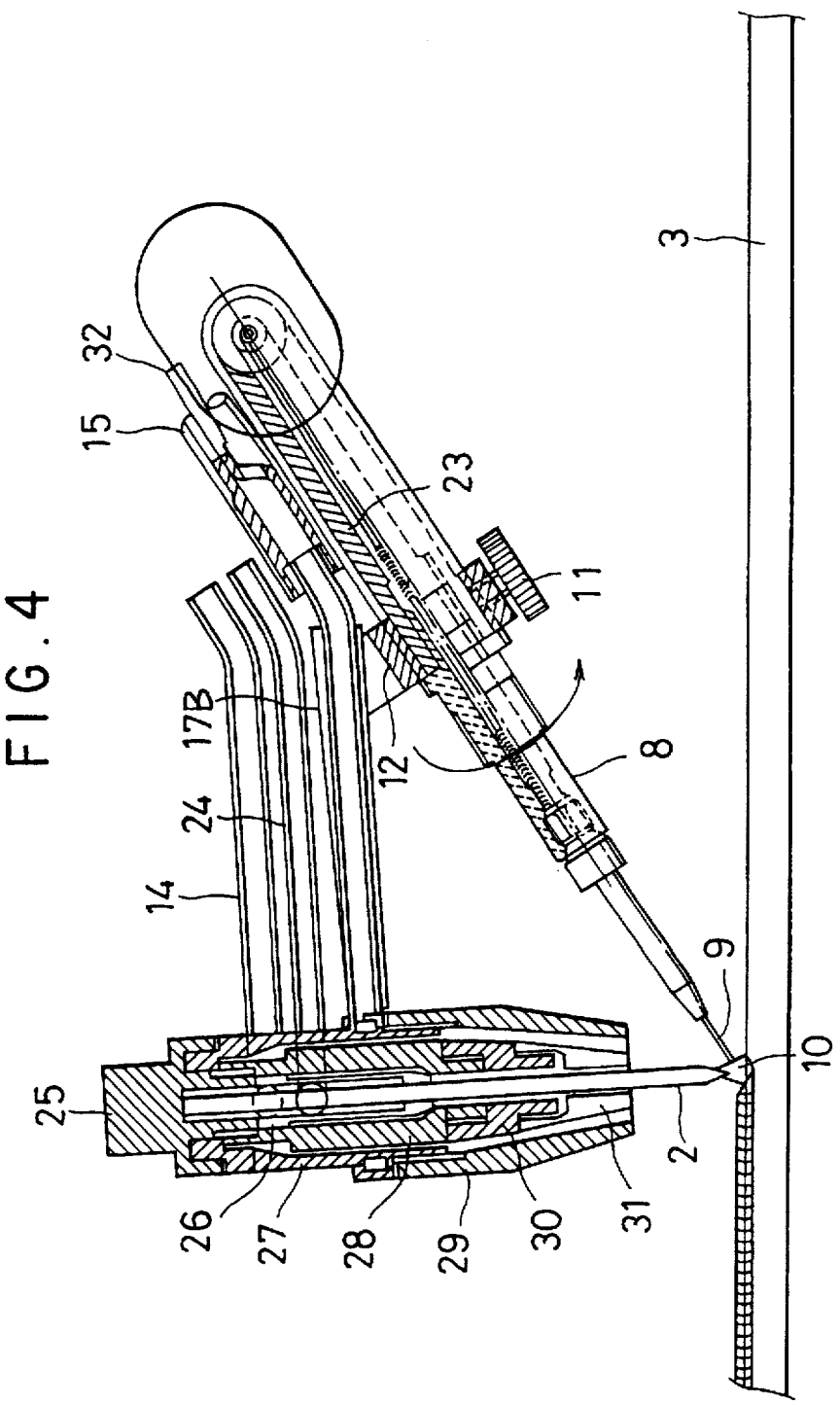
FIG. 4 is a cross section diagram of the welding torch portion of the present invention.

FIG. 4 is a cross section diagram of the welding torch portion of the present invention, showing the electroconductive cable 32 within the water-cooling welding cable supply hose 15. The welding cable 23 housed within the wire-feeding curved nozzle 8 is provided in known arrangements, but comes in contact with the inner side of the torch rotation block 12 in the present embodiment. The welding cable 23 is formed of an electroconductive material comprising a copper electroconductive plate, the same as such employed in known arrangements. Fixing thereof is performed by the inner side of the TIG torch supporting arm 17B and the torch rotation block 12. The electrical current sent from the welding apparatus electric power source 5 flows through these three cables and to the tungsten electrode 2. The direction of rotation of the TIG torch 1 is illustrated by an arrow. Rotation of the TIG torch 1 can be performed by means of the TIG torch rotation fixing screw 13.

Shielding gas flows from the shielding gas hose 14 between a gas nozzle 29 and center gas nozzle 31, and center gas flows from the center gas hose 24 between the center gas nozzle 31 and the tungsten electrode 2. Water flows into the torch inner body 28 from the water-cooling welding cable hose 15, and flows out from the water-cooling welding cable hose 16. The water-cooling welding cable hose 16 is not shown in FIG. 4, as it is behind the water-cooling welding cable hose 15. FIG. 4 also shows a torch cap 25, collet 26, TIG torch exterior body 27, and insulating nozzle 30. FIG. 4 further shows the welding wire 9 and welding arc 10 to illustrate the state of welding.

The present invention configured as above is advantageous in that TIG torch and welding wire can be placed at an optimal position for welding, welding can be conducted without having the relative positions of the wire-feeding curved nozzle and wire fluctuating, and the semi-automatic TIG welding apparatus can be reduced in weight.

The present invention is also advantageous in that the welder can weld while holding the apparatus and freely adjusting the position of the welding wire with one hand, and further in that the above-described advantages result in great savings in the expense and time related to TIG welding, and also in the amount of labor on the part of the welder.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. A semi-automatic TIG welding apparatus comprising:

a torch handle provided with a welding switch;

a wire-feeding curved nozzle which is disposed within said torch handle and is curved at a point slightly extended from said torch handle;

a TIG torch supporting arm which is fixed to a TIG torch which has a shielding gas hose and center gas hose, an inside surface of said TIG torch supporting arm being formed of an electroconductive material;

a pair of water-cooling welding cable hoses which are attached to and extend from a lower portion of a water tank through an inner side of said torch handle and attached to the inner side of said TIG torch, said water-cooling welding cable hoses being formed with electroconductive cables provided therein and being structured such that water flows through said water-cooling welding cable hoses;

a TIG torch rotation block which is rotatably mounted on said wire-feeding curved nozzle and fixed to said TIG torch supporting arm, said TIG torch rotation block having a TIG torch rotation fixing screw and being formed of an electroconductive material; and an electroconductive welding cable which is disposed within said wire-feeding curved nozzle and makes contact with an inner side of said TIG torch rotation block.

2. The semi-automatic TIG welding apparatus according to claim 1, wherein said torch handle securely houses said shielding gas hose, center gas hose, water-cooling welding cable hoses, and wire-feeding curved nozzle, so that there is no relative positional fluctuation thereof.

3. The semi-automatic TIG welding apparatus according to claim 2, wherein said torch handle is of an approximate size readily gripped by hand.

4. The semi-automatic TIG welding apparatus according to claim 3, wherein the electroconductive cable housed within said water-cooling welding cable hoses, the electroconductive material forming the inner side of said TIG torch rotation block, and said electroconductive welding cable, are formed of copper.

5. The semi-automatic TIG welding apparatus according to claim 2, wherein the electroconductive cable housed within said water-cooling welding cable hoses, the electroconductive material forming the inner side of said TIG torch rotation block, and said electroconductive welding cable, are formed of copper.

6. The semi-automatic TIG welding apparatus according to claim 1, wherein said torch handle is of an approximate size readily gripped by hand.

7. The semi-automatic TIG welding apparatus according to claim 6, wherein the electroconductive cable housed within said water-cooling welding cable hoses, the electroconductive material forming the inner side of said TIG torch rotation block, and said electroconductive welding cable, are formed of copper.

8. The semi-automatic TIG welding apparatus according to claim 1, wherein said water-cooling welding cable hoses comprise a cable supply hose which forms a path through which water flows from said water tank into said TIG torch, and a cable return hose which forms a path through which water which has entered said TIG torch returns to said water tank.

9. The semi-automatic TIG welding apparatus according to claim 8, wherein the electroconductive cable housed within said water-cooling welding cable hoses, the electroconductive material forming the inner side of said TIG torch rotation block, and said electroconductive welding cable, are formed of copper.

10. The semi-automatic TIG welding apparatus according to claim 1, wherein the electroconductive cable housed within said water-cooling welding cable hoses, the electroconductive material forming the inner side of said TIG torch rotation block, and said electroconductive welding cable, are formed of copper.

\* \* \* \* \*